United States Patent [19]

Ejima

[11] Patent Number: 5,781,232

[45] Date of Patent: Jul. 14, 1998

[54] RECORDING MEDIUM INSERTION AND REMOVAL MECHANISM

[75] Inventor: Satoshi Ejima, Tokyo, Japan

[73] Assignee: Nikon Corporation, Tokyo, Japan

[21] Appl. No.: 825,564

[22] Filed: Mar. 31, 1997

Related U.S. Application Data

[63] Continuation of Ser. No. 358,460, Dec. 19, 1994, abandoned.

[30] Foreign Application Priority Data

Dec. 28, 1993 [JP] Japan ................................. 5-334827
Aug. 22, 1994 [JP] Japan ................................. 6-197035

[51] Int. Cl.$^6$ ........................ H04N 5/76; H04N 5/225
[52] U.S. Cl. ........................ 348/233; 348/375; 312/276; 361/684; 361/754; 439/259; 439/310
[58] Field of Search ........................... 348/373, 231, 348/232, 207, 374, 375, 376, 233; 312/276; 361/684, 754, 727; 439/153, 155, 159, 259, 310, 341, 376, 929; H04N 5/225, 5/76

[56] References Cited

U.S. PATENT DOCUMENTS

| | | | |
|---|---|---|---|
| 4,176,783 | 12/1979 | Eppich | 235/474 |
| 4,611,864 | 9/1986 | Yokota | 312/9.41 |
| 4,763,300 | 8/1988 | Yukawa | 365/52 |
| 4,986,618 | 1/1991 | Wakatsuki | 312/276 |
| 5,016,107 | 5/1991 | Sasson et al. | 348/231 |
| 5,337,220 | 8/1994 | Granitz | 361/816 |
| 5,422,785 | 6/1995 | Garrett et al. | 361/684 |
| 5,473,505 | 12/1995 | Kessoku et al. | 361/684 |
| 5,657,081 | 8/1997 | Kurahashi | 348/233 |

OTHER PUBLICATIONS

IBM Technical Disclosure Bulletin: Circuit and Insertion/Extraction/Retention System: Aug. 1992.

*Primary Examiner*—Andrew Faile
*Assistant Examiner*—Andrew B. Christensen
*Attorney, Agent, or Firm*—Oliff & Berridge PLC

[57] ABSTRACT

An insertion and removal mechanism for recording media includes a door that can move between a closed position that covers a loading chamber by moving in a direction perpendicular to a direction in which the recording medium is inserted and removed. In the open position, an opening is created, through which the recording medium can be inserted and removed, by the door separating from the loading chamber. A conversion mechanism converts the operating force of the door, acting in the direction of opening and closing of the door, into a force in the direction of inserting and removing the recording medium. A first driving unit is driven in the direction of insertion and removal of the recording medium through force converted by the conversion mechanism and engages with the recording medium when the door is closing so as to cause the recording medium to be moved toward the terminals of the information device. A second driving unit is driven in the direction of insertion and removal of the recording medium through force converted by the conversion mechanism engages with the recording medium when the door unit is opening so as to cause the recording medium to move toward the side of the loading chamber opposite the terminals.

23 Claims, 17 Drawing Sheets

RECORDING MEDIUM INSERTION AND REMOVAL MECHANISM

This is a continuation of application Ser. No. 08/358,460 filed Dec. 19, 1994 now abandoned.

BACKGROUND OF THE INVENTION

1. Field of the Invention

The present invention relates to information devices, and more particularly, to a recording medium insertion and removal mechanism used to insert and remove a memory cartridge in an information device, such as an electronic still camera.

2. Description of Related Art

In recent years, so-called memory cartridges that contain memory chips have been used as recording media for information devices such as electronic still cameras. On the end surface of the memory cartridges, in the direction in which the cartridge is inserted into and removed from the information device, at least 20 and as many as 68 terminal holes are provided for signal transmission. It is necessary, when inserting the cartridge into the information device, for terminal pins provided in the information device to be inserted into each of these terminal holes. Consequently, even though the force needed for insertion of one terminal is small, overall, a comparatively large force is needed to insert and remove the memory cartridge. In addition, it is also necessary to protect the memory cartridge loading chamber formed in the information device from dust and water.

In order to overcome such problems, a mechanism is disclosed in Japanese Laid-Open Patent Applications Nos. 2-54388 and 2-54389, as shown in FIG. 16, in which an opening O in the loading chamber for the memory cartridge C formed in body B of the information device can be sealed by door D, which moves in the direction in which memory cartridge MC is inserted and removed. As shown in FIG. 17, when memory cartridge MC is inserted, the edge surface of memory cartridge MC contacts door D so that memory cartridge MC is pushed by the force of moving door D. Memory cartridge MC is pressed by protrusion d1, which is located on the side of door D toward the center of rotation. When memory cartridge MC is inserted, memory cartridge MC can be pushed with a relatively small force using a lever action because the action of closing door D is performed by placing a finger on the end farthest from the center of rotation (the upper edge in the figure). When memory cartridge MC is inserted or removed, the operating force of door D is amplified by the lever action through a lever mechanism (not shown), and memory cartridge MC is extracted.

The insertion and removal mechanism in the Japanese Laid-Open Patent Applications suffers from the following problems.

Insertion and removal of memory cartridge MC cannot be accomplished without door D being rotated by at least 90° C. because door D is provided to move in the direction in which memory cartridge MC is inserted and removed, as shown in FIG. 16. Consequently, during insertion and removal of memory cartridge MC, the tip of door D is separated from body B of the device by a large distance, making operation in small areas difficult.

When memory cartridge MC is inadvertently inserted into the loading chamber with the surface not containing the terminal holes facing inward, the terminal holes and terminal pins do not match up, and memory cartridge MC is left protruding from the loading chamber, as shown in FIG. 17. When the user tries to close door D further, a large force is applied to memory cartridge MC by the above-described lever action of door D, creating the possibility of damage to door D and to memory cartridge MC.

When memory cartridge MC is positioned in the center of the width of body B of the information device, as shown in FIG. 18A, the internal area of body B is divided into upper and lower sections, thereby preventing efficient placement of internal mechanisms. Therefore, it is necessary to position memory cartridge MC at one end of the width of body B, as shown in FIG. 18B. In this case, because of the above-described positional relationship between door D and the direction of inserting and removing memory cartridge MC, memory cartridge MC must be capable of being inserted and removed from end surface b1 of body B. It is also necessary to provide door D at a position leaning toward one edge of end surface b1, which places large constraints on design.

When memory cartridge MC is removed, two actions are necessary. A button b3 on the body B must be depressed in order to depress engagement stop latch b2 (see FIG. 16) which engagingly stops door D in the closed position. Then door D must be opened.

SUMMARY OF THE INVENTION

It is an object of the present invention to provide a recording medium insertion and removal mechanism that can be used with ease in small areas.

It is another object of the present invention to provide a recording medium insertion and removal device that does not apply a large force to the recording medium even when insertion of the recording medium becomes impossible midway through the action of insertion.

It is still another object of the present invention to provide a recording medium insertion and removal device that enhances the freedom of design in comparison to conventional models, and that minimizes the operations needed to open the door.

The present invention is applied to an information device that at least inputs or outputs information to a recording medium. Insertion-type terminals provided on the information device and on the recording medium are inserted and removed with the insertion and removal of the recording medium into a loading chamber.

In order to achieve the above and other objects of the invention, embodiments of the present invention include a door unit that can move between a closed position that covers a loading chamber by moving in a direction perpendicular to the direction in which the recording medium is inserted and removed, and an open position that creates an opening through which the recording medium can be inserted and removed by the door separated from the loading chamber by moving in a perpendicular direction relative to the recording medium insertion/removal direction. A conversion mechanism converts the operating force of the door unit (i.e., the force acting to open and close the door unit) into a force in the direction of inserting and removing the recording medium. A first driving unit is driven in the direction of insertion and removal of the recording medium through the force converted by the conversion mechanism and engages with the recording medium when the door unit is closing so as to move the recording medium toward terminals of the information device. A second driving unit is driven in the direction of insertion and removal of the recording medium through the force converted by the conversion mechanism, and engages with the recording medium when the door unit is opening so as to cause the recording medium to move toward the side of the loading chamber opposite the terminals in the information device.

The length of insertion of the recording medium into the loading chamber is such that engagement between the first driving unit and the recording medium is released below a standard value set so as to differentiate between the absence or presence of a recording medium in the loading chamber.

The first driving unit withdraws from the path of insertion and removal of the recording medium in conjunction with the motion of the door unit toward the open position.

An engagement stop unit is provided on the loading chamber. A key unit, which releases the engagement of the door unit is attached to the door unit so that an engagement release action is possible from the outside of the information device when the door unit is in the closed position.

Support units, which support the recording medium inside the loading chamber, are provided so as to be capable of moving in the direction of opening and closing of the door unit. The support units are integrally constructed with the door unit. Terminals in the information device are attached to the support units.

External connections are provided on the outer surface of the door unit so as to permit electrical connection of the information device to a device other than the recording medium.

Additionally, a stop member can be provided to stop the action of insertion of the recording medium by the first driving unit when the insertion force on the terminals of the recording medium exceeds a predetermined value.

Similarly, an insertion force limiting mechanism can be provided to limit the insertion force applied to the recording medium from the first driving unit to not more than a predetermined value.

The stop member can also stop the action of insertion of the recording medium by the first driving unit when the recording medium is inserted in a direction such that the recording medium does not correctly fit with the terminals of the information device.

Because the loading chamber for the recording medium is covered by a door unit that moves in a direction perpendicular to the direction of insertion and removal of the recording medium, an opening for inserting and removing the recording medium is created immediately on the side toward the direction of operation when the door unit is opened. Moreover, the door unit is not present over the extension of the opening. Consequently, only a small amount of movement by the door unit is needed. In particular, when the door unit is attached to the information device so as to be capable of rotational movement, the amount of movement of the door unit can be kept to a minimum by using the opening created on the side farthest from the center of rotation of the door unit as the opening for inserting and removing the recording medium. In this case, because it is impossible to further insert the recording medium midway through insertion into the loading chamber, and the recording medium is pinched between the information device and the end of the door unit farthest from the center of rotation, there is no fear that the force of closing the door unit will be amplified through the lever action of the door unit.

The door unit can be positioned on a surface other than the side surface of the information device in the direction of insertion and removal of the recording medium, thereby providing great liberty in selecting the position where the door unit is provided. Even though the direction of insertion and removal of the recording medium and the direction of opening and closing of the door unit do not match, the force of operating the door unit is converted into a force applied in the direction of inserting and removing the recording medium through the conversion mechanism, and the driving of the driving units. Accordingly, the recording medium is positively driven into contact with the terminals of the information device through engagement of the driving units with the recording medium. Consequently, the terminals of the information device and the recording medium can be inserted and removed by the force of operating the door unit. It is also possible to amplify the force of operating the door unit 3 by providing the conversion mechanism with a lever action or similar mechanism.

The engagement between the recording medium and the first driving unit that drives the recording medium toward the terminals of the information device is released when the insertion length of the recording medium is less than a standard value. Consequently, when the recording medium is incorrectly positioned it is not unreasonably forced into the loading chamber by the first driving unit 52.

The first driving unit withdraws from the path of insertion and removal of the recording medium when the door unit is opened. Consequently, the first driving unit is not an obstacle when the door unit is opened and the recording medium is being inserted into or removed from the loading chamber.

The door unit can be closed and kept closed by operating a key unit such that the key unit engages with an engagement stop. The door unit can be operated by merely lifting the key unit in the direction of opening the door unit.

The recording medium can be easily inserted or removed because support units protrude from the loading chamber when the door unit is opened. In particular, when the terminals of the information device are also attached to the support units, the terminals face the outside of the loading chamber when the door unit is opened. Therefore, it is unnecessary to reserve space in the loading chamber for the insertion and removal of the terminals.

A line to the terminals provided in the loading chamber and the external connections can be connected through a short path via a fulcrum when the door unit is attached to the information device.

The action of inserting the recording medium using a first driving unit stops when the force of insertion on the terminals from the recording medium exceeds a predetermined value, thereby preventing the recording medium from being incorrectly inserted.

The insertion force applied to the recording medium from the first driving unit is limited to no more than a predetermined value, thereby preventing the recording medium from being incorrectly inserted.

When the recording medium is inserted in a direction that does not correctly match the terminals of the information device, the action of inserting the recording medium using the first driving unit stops, thereby preventing the recording medium from being incorrectly inserted.

BRIEF DESCRIPTION OF THE DRAWINGS

The invention will be described in detail with reference to the following drawings in which like reference numerals designate like elements and wherein.

DETAILED DESCRIPTION OF PREFERRED EMBODIMENTS

A first embodiment of the present invention will be explained in detail with reference to FIGS. 1 to 10.

Figure 1:
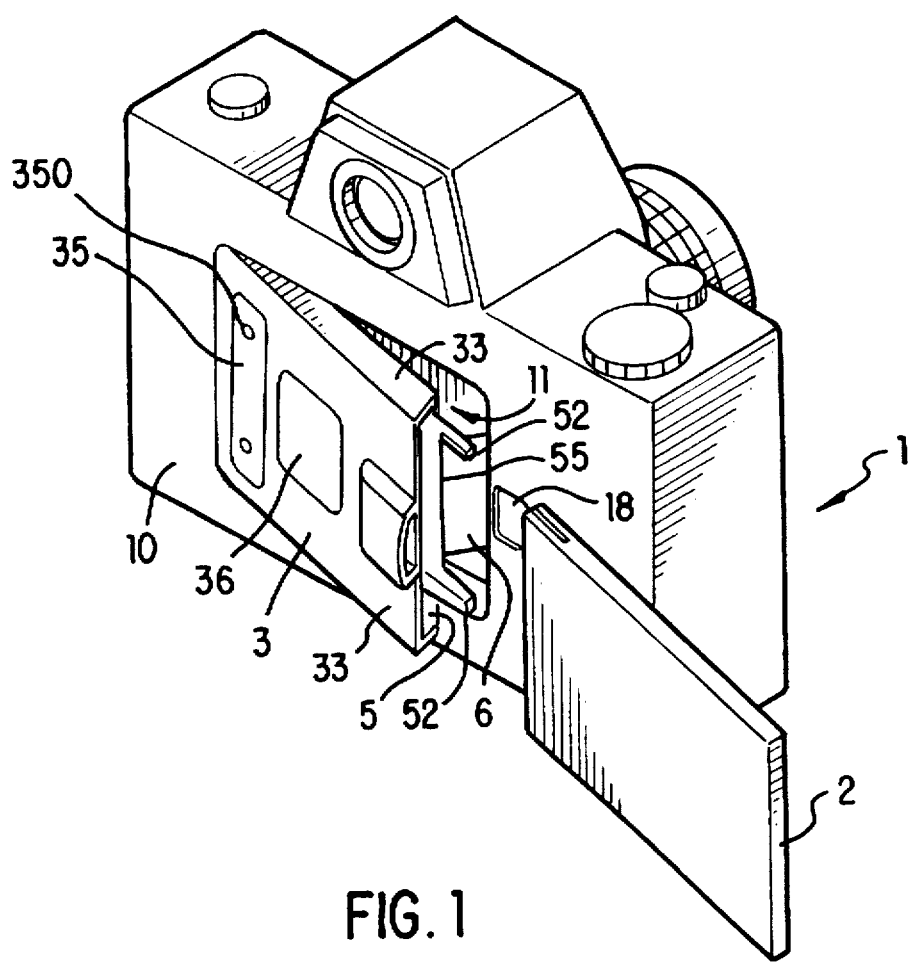
FIG. 1 is a perspective view showing the back of an electronic still camera with an insertion and removal mechanism according to an embodiment of the present invention.
Figure 2:
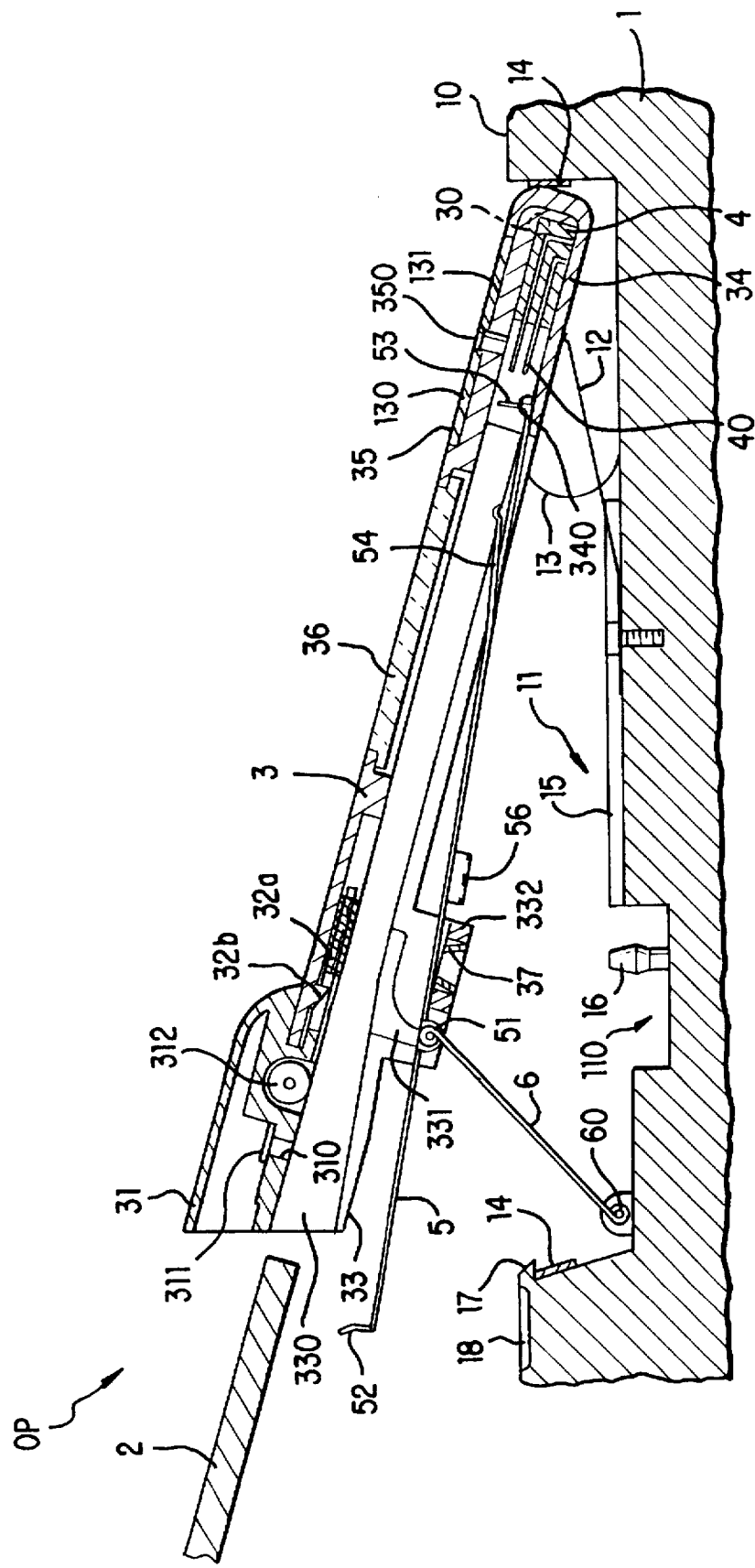
FIG. 2 is a side, cross-sectional view showing an insertion and removal mechanism according to an embodiment of the present invention with the door fully opened.

As shown in FIG. 1, loading chamber 11 for memory cartridge 2, which is in the shape of a rectangular plate, is formed essentially in the center of back surface 10 of an information device, such as, for example, an electronic still camera. A door 3 is provided so as to cover loading chamber 11. As shown in FIG. 2, door 3 is attached to information device 1 so as to be capable of rotation about an axis of rotation 30, and is forced in a direction away from loading chamber 11 by plate spring 12, which is solidly fixed to the bottom surface of loading chamber 11. When door 3 is raised, as shown in FIG. 2, about the axis of rotation 30, an opening OP is created at the end of door 3 opposite the axis of rotation 30 so that memory cartridge 2 can be inserted or removed. The end of door 3 toward the axis of rotation 30 will be referred to as the fulcrum end, while the end opposite the axis of rotation 30 will be called the tip end.

A knob 31, which can slide to the left and right, as shown in FIG. 2, is attached to the surface of door 3. Knob 31 is forced toward the tip end of door 3 by a coil spring 32a attached to door 3, and kept in contact with protrusion 32b, which is formed as an integral unit with door 3. Knob 31 is hollow with an opening toward the tip end of door 30 so that the user can easily place a finger on the knob. A hole 310 is formed in the bottom surface knob 31. The top of hole 310 is covered with a waterproof sheet 311 allows air to pass but does not allow moisture to pass. Hole 310 and waterproof sheet 311 are shown only in FIGS. 2 and 5.

A first support unit 33, as shown in FIG. 1, which protrudes toward loading chamber 11 is formed on both sides of door 3. First support unit 33 includes grooves 330, which fit with the two sides of memory cartridge 2 so as to support memory cartridge 2. See FIG. 3. A low friction film, (not shown) is adhered to the surface of grooves 330 in order to reduce the friction when memory cartridge 2 is inserted or removed. A roller 312 is attached to knob 31. A second support unit 34 is formed at the fulcrum end of door 3, inside of which is formed a groove 340 that can support the end of memory cartridge 2 containing the terminal holes. Furthermore, a terminal block 4 is attached to the side of groove 340 toward the interior of the mechanism.

Figure 6:
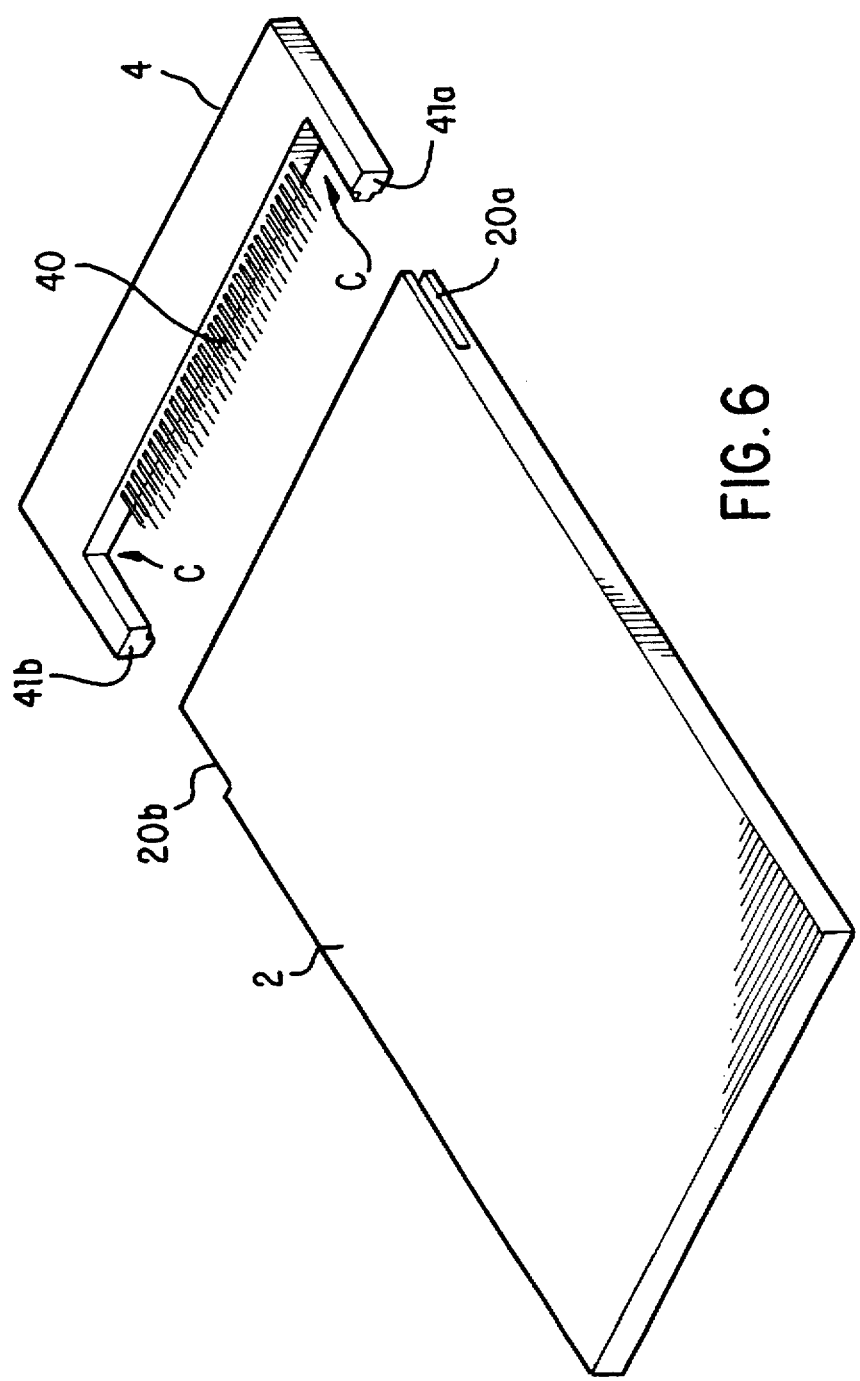
FIG. 6 is a perspective view of the memory cartridge according to an embodiment of the invention.

As shown in FIG. 6, terminal block 4 is a device into which a plurality of terminal pins 40 are anchored. Terminal pins 40 are inserted into and removed from terminal holes (not shown) formed in one end of memory cartridge 2. Protruding components 41a and 41b are formed on each side of terminal block 4 so as to fit with indentations 20a and 20b formed on each side of memory cartridge 2. Because the width and positioning of protrusions 41a and 41b and indentations 20a and 20b varies between the left and right, when memory cartridge 2 is inserted with the top and bottom reversed, indentations 20a and 20b do not fit with protrusions 41a and 41b, and it is impossible to insert memory cartridge 2 to a position where terminal pins 40 are inserted by a preset amount. The same is also true when memory cartridge 2 is inserted backwards relative to the direction of insertion and removal.

As shown in FIG. 2, terminal pins 40 are electrically connected to electrical circuits (not shown) in information device 1 through a flexible printed circuit board 13 (hereafter abbreviated FPC). Part of FPC 13 is pulled as far as the surface of door 3, and is covered by a dust- and water-proofing cover 35 which is attached to door 3 by means of screw 350. When cover 35 is removed, external connections 130 and 131 of FPC 13 are exposed to the outside. External connections 130 and 131 are used to connect electrical circuits in information device 1 to other devices, such as an external memory device with a larger memory capacity than memory cartridge 2. Details of the method of connection will be provided below. Reference number 36 designates a transparent window through which the absence or presence of a memory cartridge 2 can be confirmed.

A card driving plate 5 is provided on the underside of door 3, and card driving plate 5 is linked, via shaft 51, to the top end of connecting plate 6 so as to be capable of rotational movement. The bottom end of the connecting plate 6 is attached to the bottom surface of the loading chamber 11 via shaft 60 so as to be capable of rotational movement. One end of card driving plate 5 is inserted into groove 340 in second support unit 34 of door 3 in order to restrict free rotation of card driving plate 5 around shaft 51. Both ends of shaft 51 are inserted into cam grooves 331 formed in the lower surface of first support unit 33. Shaft 51 is moved to the bottom end of cam grooves 331, as shown in FIG. 2, accompanying the rotation of door 3 in a clockwise direction under the driving force of plate spring 12, at which position the rotation of door 3 is restricted.

Hooks 52 and 53 are formed at both ends of card driving plate 5, and engage with memory cartridge 2. When door 3 rotates to the position shown in FIG. 2 to permit insertion or removal of memory cartridge 2, the positional relationship between connecting plate 6 and cam grooves 331 is such that hook 52 withdraws sufficiently toward the bottom of loading chamber 11 by an amount greater than the extension of grooves 330 in support unit 33. The other hook 53, is capable of insertion into the space between indentations 41a and 41b and terminal pins 40, as shown in FIG. 6. In the hook 53 end of card driving plate 5, a plate spring 54 is provided that presses memory cartridge 2, which has been inserted into grooves 330, against door 3. In addition, a gap 55 is formed at the tip end of card driving plate 5, as shown in FIG. 1, so as to make grasping of memory cartridge 2 housed in door 3 easy. Furthermore, a pressure plate 56 is provided on both sides of card driving plate 5 so that contact with the bottom surface of first support unit 33 in door 3 is possible.

Figure 5:
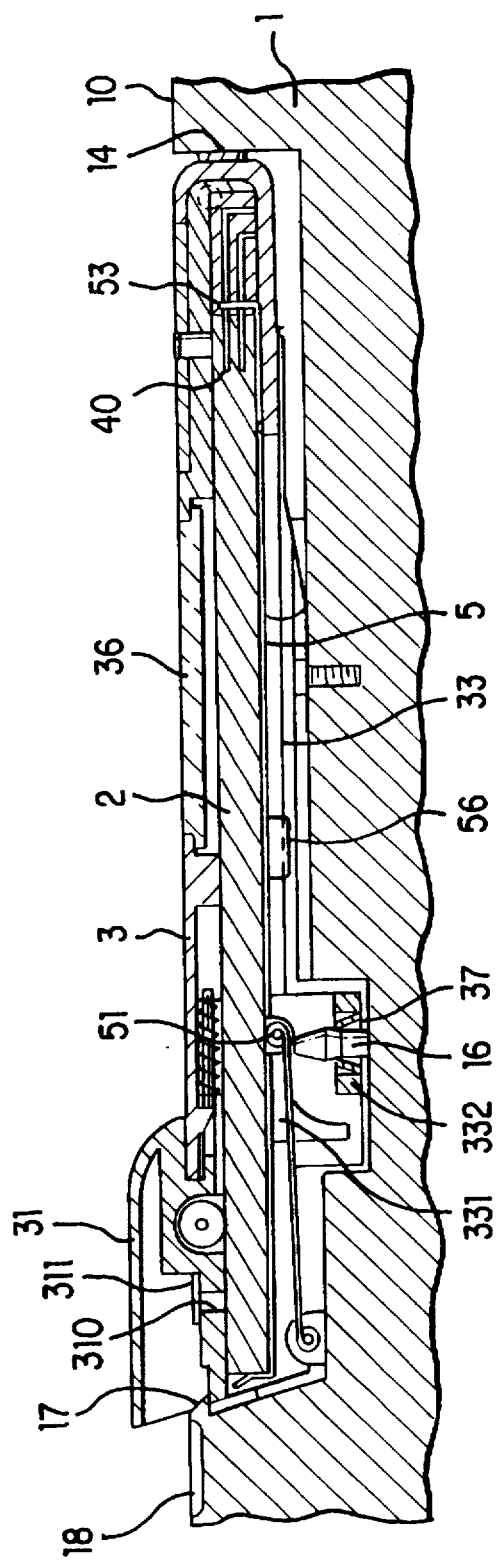
FIG. 5 shows the insertion and removal mechanism of FIG. 3 with the door completely closed.

Around the perimeter of loading chamber 11, a silicone foam 14, which tightly contacts the outer perimeter of the door, is fixed so as to encircle loading chamber 11. On the bottom surface of loading chamber 11, a water absorbent sheet 15 is attached, which absorbs moisture that enters loading chamber when door 3 is opened. This prevents short circuits and the like in terminal pins 40. In addition, a step pin 16 is attached to indentation 110 in loading chamber 11. Furthermore, a plastic ring 37 which can fit over step pin 16 is formed into a beam unit 332 that protrudes from the bottom of first support unit 33 in door 3 toward the bottom of card driving plate 5. A protrusion 17 is formed in loading chamber 11 opposite the tip end of door 3, and an indentation 18 is formed to its outside, as shown in FIGS. 2 and 5. A limit switch (not shown) is also provided in loading chamber 11 and detects the action of closing door 3 by coming into contact with door 3 and card driving plate 5 when door 3 is closed.

Figure 16:
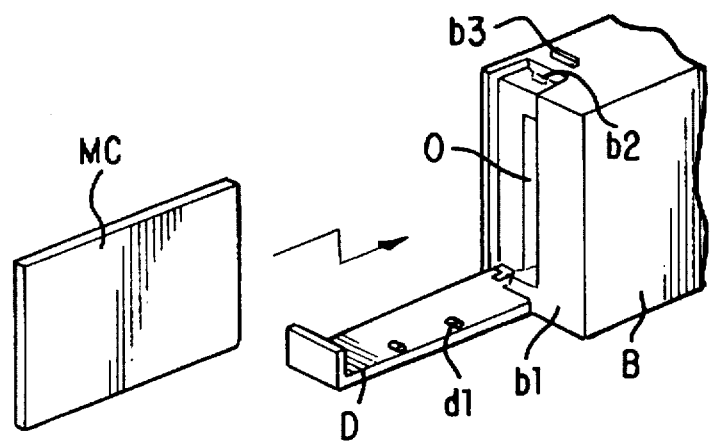
FIG. 16 is a perspective view of the door portion of a conventional insertion and removal mechanism.
Figure 17:
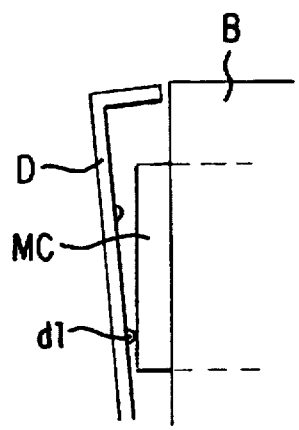
FIG. 17 is a first view showing the door in the insertion and removal mechanism of FIG. 16 immediately prior to closing.
Figure 18A:
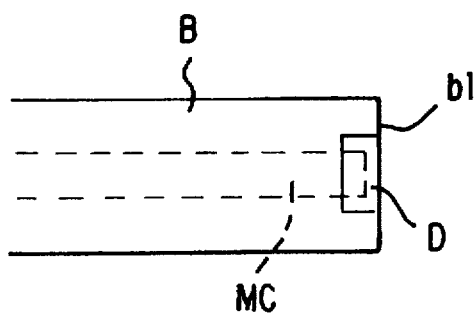
FIGS. 18A and 18B are views showing the internal space of an information device in accordance with the positioning of the recording medium.
Figure 18B:
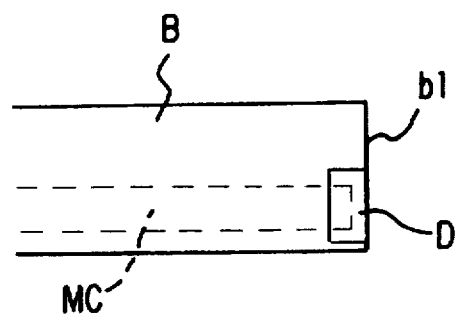

The operation of the above-described insertion and removal mechanism will be explained along with the operation of inserting or removing memory cartridge 2. In order to insert memory cartridge 2 into loading chamber 11, memory cartridge 2 is inserted into grooves 330 in door 3. The terminal holes are inserted first, with the door being open, as shown in FIG. 2. The amount of rotational movement of door 3 needed is greatly reduced in comparison to the conventional model shown in FIG. 16 because the memory cartridge 2 is inserted from the side relative to the direction of opening and closing of door 3. Moreover, hooks 52 are not an obstacle because they withdraw from the path of insertion of memory cartridge 2, thereby allowing an even greater reduction in the amount of opening of door 3. Insertion of memory cartridge 2 below card driving plate 5 is impossible because of connecting plate 6.

Figure 3:
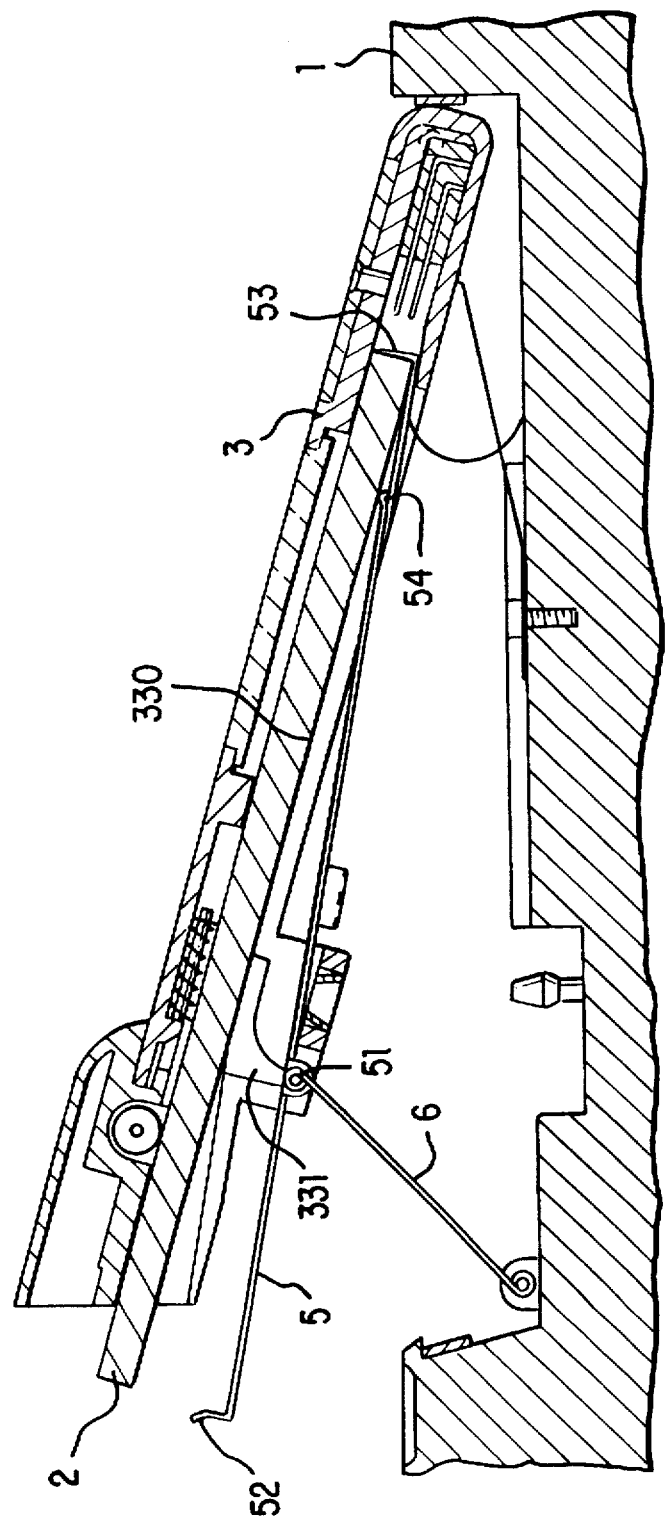
FIG. 3 shows the insertion and removal mechanism of FIG. 2 with a memory cartridge inserted.
Figure 4:
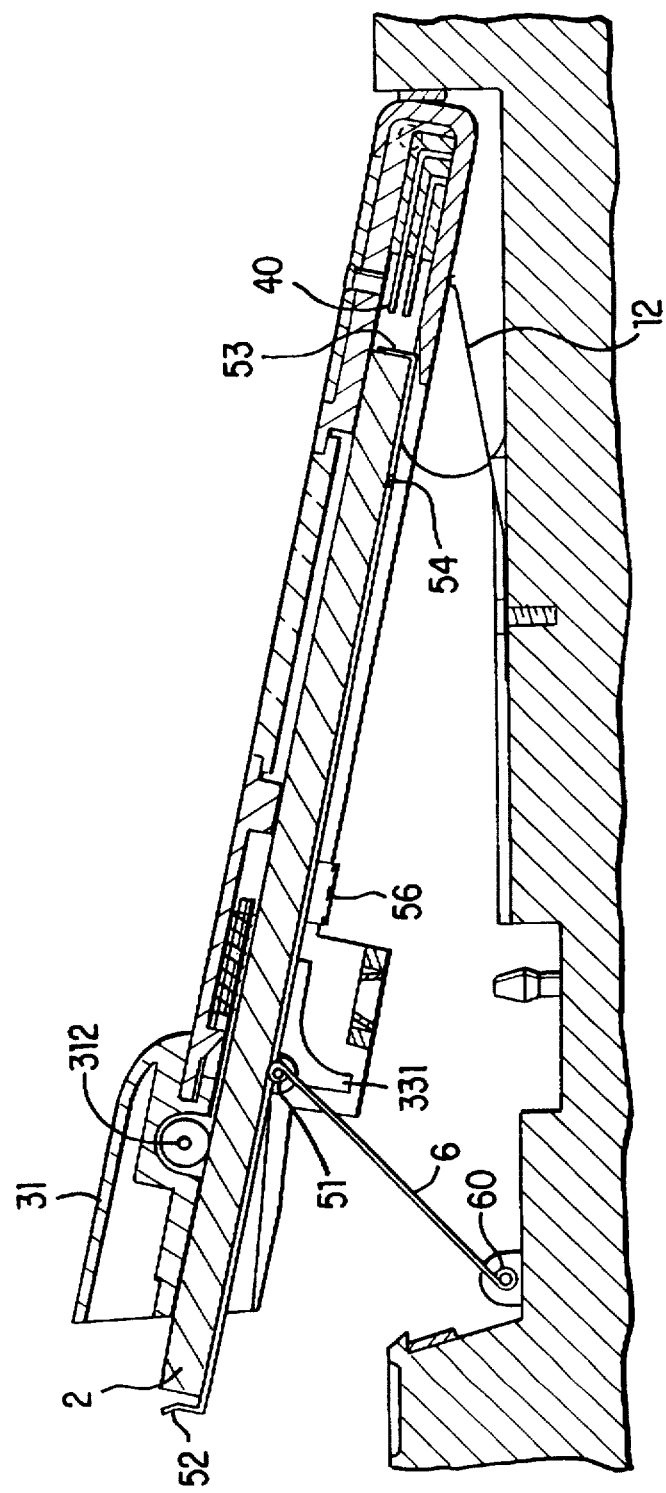
FIG. 4 shows the insertion and removal mechanism of FIG. 3 with the door slightly closed.

Memory cartridge 2 guided by grooves 330 is stopped at the position where it contacts hooks 53, as shown in FIG. 3, because hooks 53 at the far end of card driving plate 5 are positioned to the front of terminal pins 40 in the position shown in FIG. 2. As shown in FIG. 4, door 3 is closed, and memory cartridge 2 and card driving plate 5 come into close contact as door 3 moves toward loading chamber 11. At this time, shaft 51 moves to the top end of cam grooves 331.

As door 3 is further depressed from the position shown in FIG. 4, shaft 51 moves in cam grooves 331 toward the fulcrum end of door 3. Card driving plate 5 slides toward the fulcrum end of door 3, while pushing memory cartridge 2 toward terminal pins 40 by means of hooks 52. Furthermore, when door 3 is fully closed, as shown in FIG. 5, terminal pins 40 are inserted a predetermined amount into the terminal holes in memory cartridge 2, and insertion of memory cartridge 2 is completed. By sliding knob 31 toward the tip end of door 3, knob 31 engages protrusion 17 so that door 3 cannot fly open. In addition, ring 37 provided in door 3, elastically deforms as it is pushed toward the base of step pin 16. Door 3 is thereby forced in the closing direction by the restorative force of ring 37. Accordingly, even if knob 31 is unknowingly moved toward the fulcrum end of door 3 through contact with clothing or the like, door 3 remains closed.

Foam 14 is pressed by contact with door 3, and keeps water and dust from entering through the space between the wall of loading chamber 11 and door 3. When the volume of information device 1 changes, such as through the scrolling in and out of a zoom lens mounted on information device 1, air passes through hole 310, thereby regulating the pressure inside the information device so that it is always the same as the atmospheric pressure. It is also possible to form hole 310 in a location other than knob 31, but because knob 31 is hollow, forming hole 310 at this location offers the advantage that hole 310 does not stand out. When door 3 is closed without memory cartridge 2 inserted, pressure plate 56 of card driving plate 5 engages with first support unit 33 in door 3 and is forced downward as shown in FIG. 4. As shown in FIG. 5, card driving unit 5 then slides toward the fulcrum end of door 3 so that door 3 is closed with the memory cartridge removed.

When memory cartridge 2 is to be removed, knob 31 is moved toward the fulcrum end of door 3 thereby releasing the engagement with protrusion 17. Knob 31 is then raised to open door 3. Because all of these actions can be performed by placing a finger on knob 31, operation is easier than in a conventional model where it is necessary to change from holding the body to holding the door of the information device. In addition, because of indentation 18, placing a finger on knob 31 is easy even when door 3 is closed.

When door 3 is opened, shaft 51 moves in cam grooves 331 toward the tip end of door 3, opposite the movement of the above-described insertion of memory cartridge 2. Card driving plate 5 pushes memory cartridge 2 in the direction away from terminal pins 40 using hooks 53, card driving plate 5 slides toward the tip end of door 3, and memory cartridge 2 pulls away from terminal pins 40. Furthermore, when door 3 is fully open as shown in FIG. 2, hooks 52 on card driving plate 5 withdraw downward so that memory cartridge 2 can be easily removed. Memory cartridge 2 presses lightly against the surface of door 3 via plate spring 54, thereby preventing memory cartridge 2 from accidentally being dropped when door 3 opens.

Figure 7:
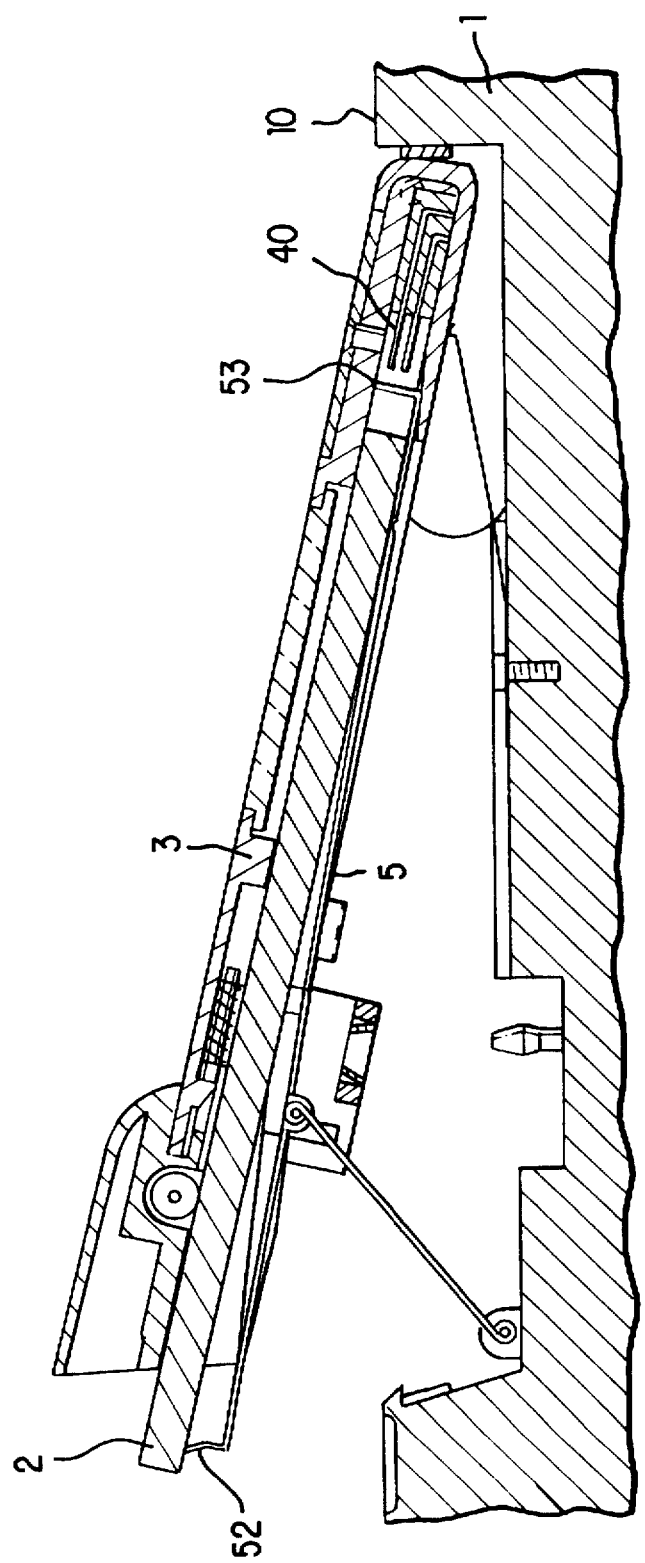
FIG. 7 is a side, cross-sectional view of the insertion and removal mechanism showing the memory cartridge inserted in an incorrect manner.
Figure 8:
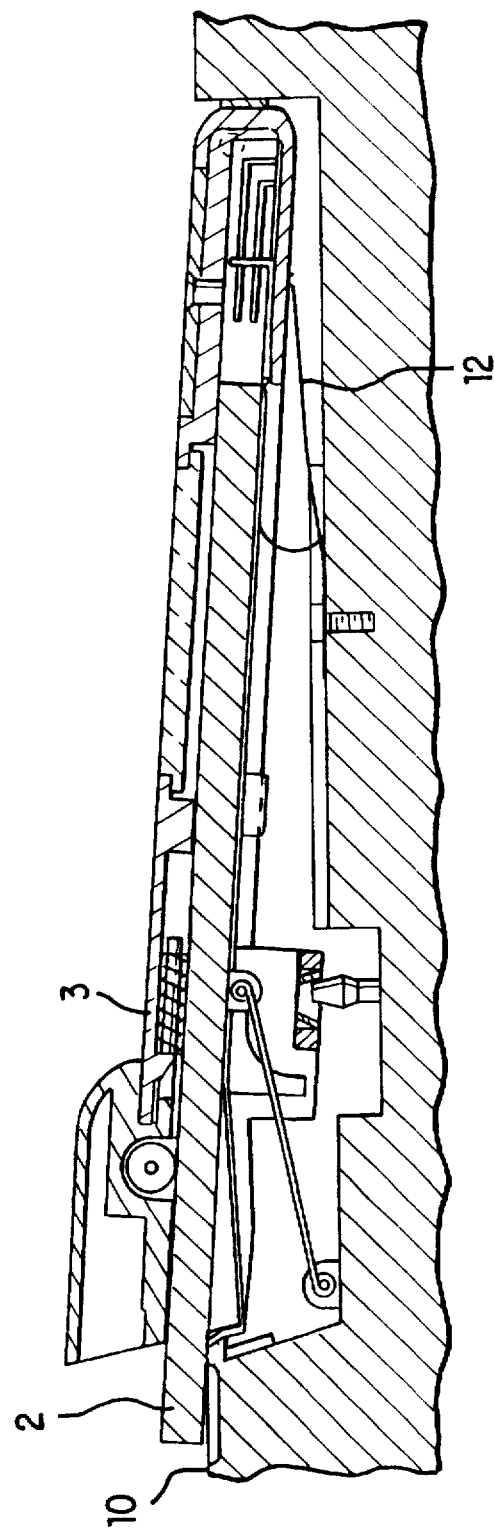
FIG. 8 shows the insertion and removal mechanism of FIG. 7 with the door completely closed.

Next, the actions that occur when memory cartridge 2 is inserted in the wrong direction either in the direction of width or in the direction of insertion and removal will be explained. When memory cartridge 2 is inserted incorrectly, terminal pins 40 cannot be inserted into memory cartridge 2 by the predetermined amount, and memory cartridge 2 is stopped in front of terminals 40, as shown in FIG. 7. This is the position where memory cartridge 2 and the tip of protrusions 41a and 41b on terminal block 4 meet each other. When door 3 is closed in this state, hooks 52 of card driving plate 5 hit the side surface of memory cartridge 2, thereby preventing close contact between card driving plate 5 and memory cartridge 2. When an attempt is made to further close door 3, card driving plate 5 moves, under guidance from shaft 51 and cam grooves 331, toward the fulcrum end of door 3 with memory cartridge 2 still protruding. Furthermore, memory cartridge 2 becomes pinched between back surface 10 of information device 1 and the tip end of door 3, as shown in FIG. 8. Accordingly, memory cartridge 2 cannot be inserted incorrectly in a harmful manner. The pressing force of door 3 amplified by lever action is not applied to memory cartridge 2, because memory cartridge 2 strikes the tip end farthest from the center of rotation of door 3, thereby eliminating possible damage to memory cartridge 2 or door 3. When the user's hand is removed from the door, door 3 opens from the position shown in FIG. 8 under the force of plate spring 12, and it is immediately possible to correctly reinsert memory cartridge 2.

Figure 9:
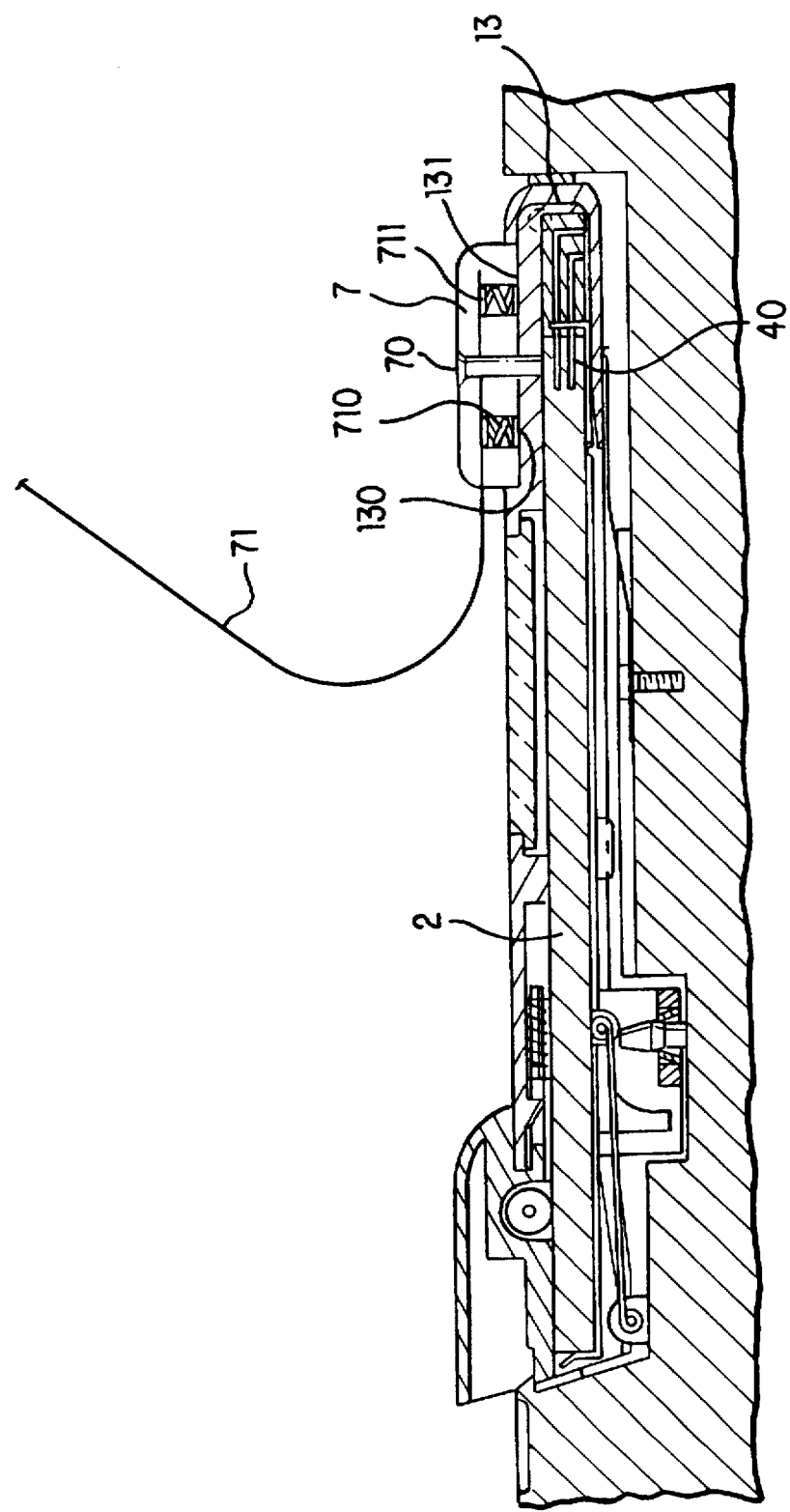
FIG. 9 is a side, cross-sectional view showing an insertion and removal mechanism according to an embodiment of the present invention connected to another device using external connections.

When a device other than memory cartridge 2 is to be connected to information device 1, cover 35, shown in FIGS. 1 and 2, is removed and a connector 7 is attached by means of screw 70, for example, as shown in FIG. 9. Connector 7 is provided with connections 710 and 711 to an FPC 71 which extends from the electrical circuits in another device (not shown). These connections 710 and 711 come into contact with external connections 130 and 131 to electrically connect information device 1 and the other device. Part of FPC 13 hooked to terminal block 4 is extended as far as the surface of door 3 via the center of rotation of door 3, and external connections 130 and 131 are provided here. Because of this, the amount of extension of FPC 13 from terminal block 4 to external connections 130 and 131 can be kept to a minimum. Conventionally, the terminal pins were provided at a position farthest from the door, as is clear from FIG. 16, because of which it has been impossible to use a layout such as that provided in the present embodiment.

External connections 130 and 131 are connected in parallel with the bus line of terminal block 40, and are also connected to a signal line for controlling memory cartridge 2 from the other connected electrical circuits. When a signal is sent from the other electrical circuits via the signal line to set the card selection terminal of memory cartridge 2 to HI, information transfer to and from memory cartridge 2 is enabled. When a signal is sent to set the card selection terminal to LOW, the bus line of memory cartridge 2 becomes a high impedance line, and information transfer to and from memory cartridge 2 is disabled.

Figure 10:
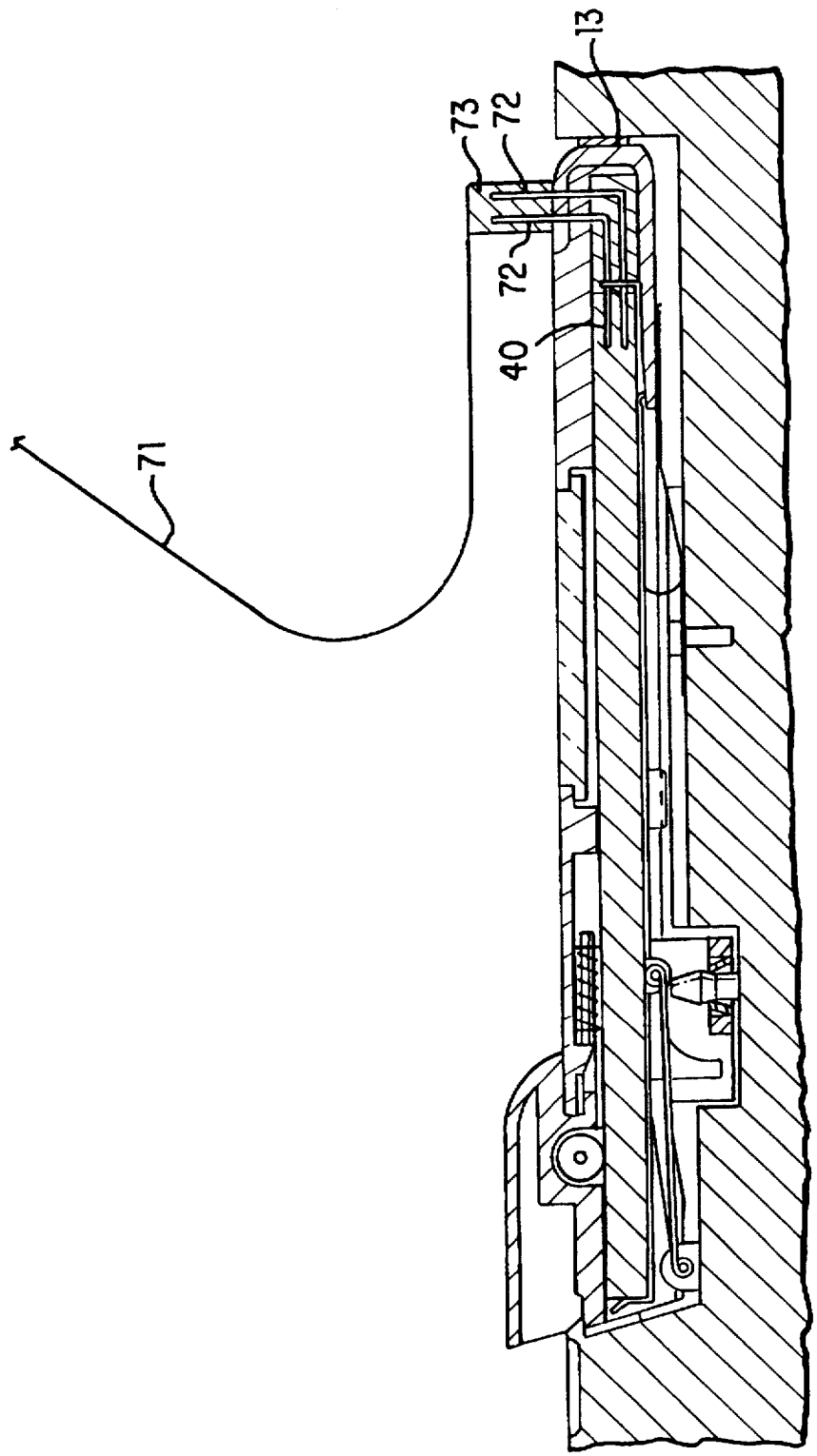
FIG. 10 is a side, cross-sectional view showing an insertion and removal mechanism according to an embodiment of the present invention connected to another device using external connections.

FIG. 10 shows another example of a connection between information device 1 and an external device. In this example, terminal pins 72 are provided from FPC 13 to the surface of door 3. The terminal pins 72 are inserted into terminal holes in a connector 73 provided at the end of FPC 71, thereby electrically connecting information device 1 and the other device. In this example, use of special equipment such as connector 7 of FIG. 9 is unnecessary when connecting to a device which uses the same type of terminal pins as memory cartridge 2, which reduces the cost.

Loading chamber 11 and door 3 are provided essentially in the center of back surface 10 of information device 1. It would also be appropriate to provide these in a different position on back surface 10 or on a surface other than back surface 10. It would also be appropriate to have a structure wherein the memory cartridge is not supported by the door, but is inserted directly into a support unit solidly attached to loading chamber 11. In this case, terminal block 4 should also be separated from door 3 and solidly attached inside loading chamber 11. However, when this kind of structure is used, it is necessary, when inserting memory cartridge 2 into loading chamber 11, to move memory cartridge 2 inside loading chamber 11 by the amount of insertion of terminal pins 40, thus requiring loading chamber 11 to be that much larger. It is unnecessary to move memory cartridge 2 in the direction of terminal pins 40 inside loading chamber 11, providing the advantage of a compact loading chamber 11. It would also be appropriate to separate first support unit 33 and second support unit 34 from door 3, and to link the operation of these units to the operation of door 3 through a linking or similar mechanism.

In this first embodiment, information device 1 comprises a camera, memory cartridge 2 comprises a recording medium, door 3 comprises a door unit, card driving plate 5, connecting plate 6 and cam grooves 331 function as a conversion means or mechanism that converts the force of movement of the door 3 into a perpendicular force in the direction of insertion and removal of the recording medium. Hooks 52 on card driving plate 5 comprise the first driving unit, hooks 53 comprise the second driving unit, protrusion 17 in loading chamber 11 comprises the engagement stop unit, knob 31 comprises the key unit, and first support unit 33 and second support unit 34 comprise the support units. When the memory cartridge is inserted the wrong way and is stopped by contacting terminal block 4, as shown in FIG. 7, the amount of insertion of memory cartridge 2, corresponds to a standard value that is set in order to differentiate between the absence or presence of incorrect insertion.

A second embodiment of the present invention is explained in detail with reference to FIGS. 11 to 14. Structures that are the same as in FIGS. 1 to 10 are marked with the same reference numbers in FIGS. 11 to 14, and a repeated explanation of the same is omitted.

Figure 11:
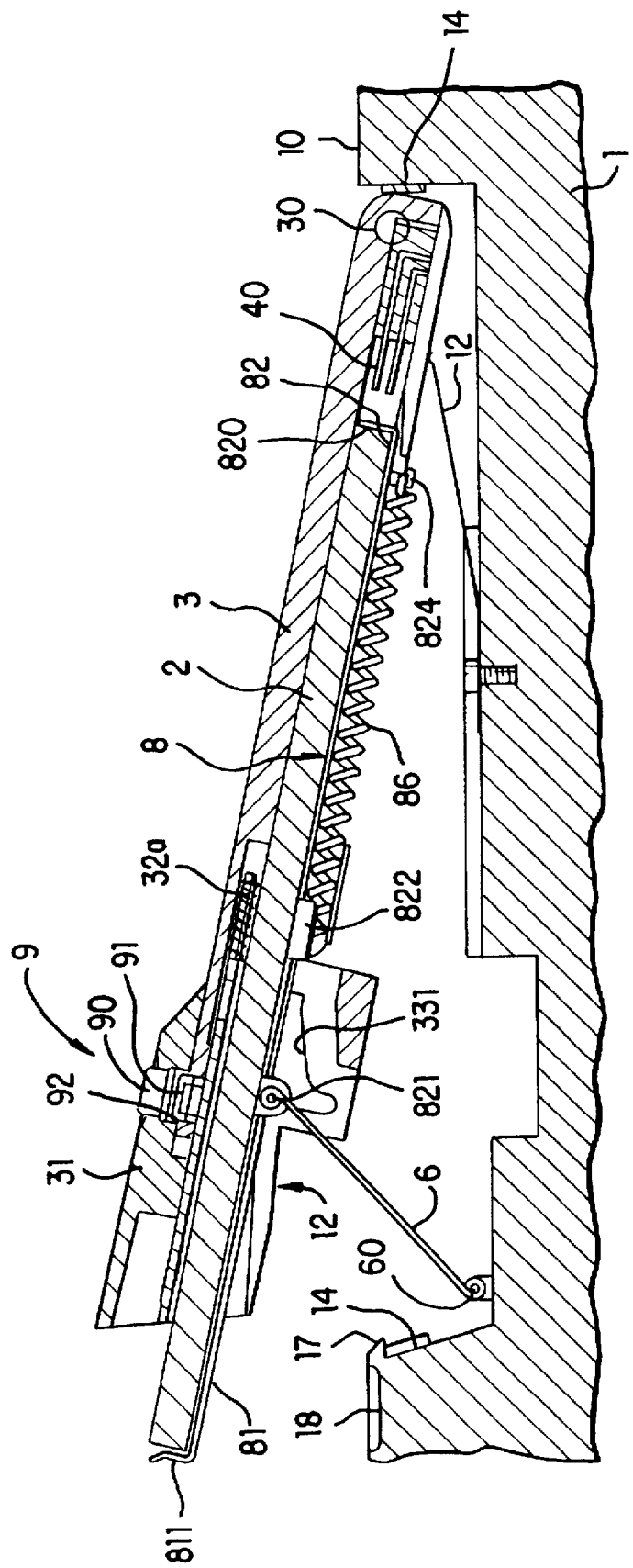
FIG. 11 is a side, cross-sectional view showing an insertion and removal mechanism according to a second embodiment of the present invention.
Figure 12:
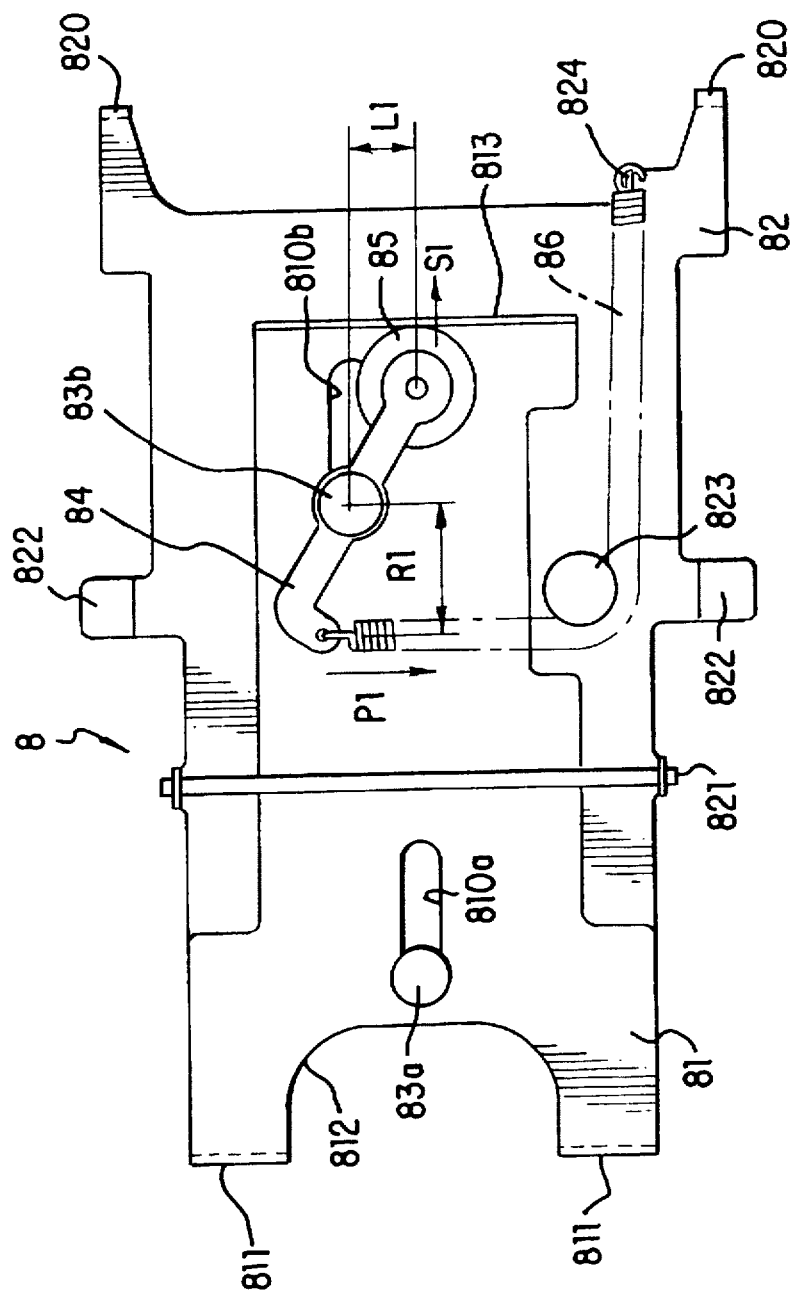
FIG. 12 is a plan view of the card driving plate of FIG. 11 as seen from the direction indicated by arrow 12 in FIG. 11.

FIG. 11, which corresponds to FIG. 4 of the first embodiment described above, shows the structure of door 3 and surroundings in an information device according to the second embodiment. In FIG. 4, card driving plate 5 comprises a single plate, but in FIG. 11, card driving plate 8 is divided into two plates, namely a first driving plate 81 and a second driving plate 82. FIG. 12 shows the underside of card driving plate 8. First driving plate 81 is positioned to fit tightly with the underside of second driving plate 82. Two elongated holes 810a and 810b are formed in first driving plate 81, and shafts 83a and 83b, which are solidly fixed to second driving plate 82, fit into elongated holes 810a and 810b. First driving plate 81 and second driving plate 82 are capable of relative movement in the direction of insertion and removal of memory cartridge 2. In the example shown in FIG. 12, shafts 83a and 83b are provided, on the side opposite second driving plate 82, with heads having a diameter larger than that of elongated holes 810a and 810b so as to fix first driving plate 81 and second driving plate 82 against each other.

A pair of hooks 811 and a gap 812 are provided in first driving plate 81, and a pair of hooks 820, a shaft 821 and a pressure plate 822 are provided in second driving plate 82. The following parts in the second embodiment correspond to the parts in the first embodiment. Hooks 811 correspond to hooks 52, gap 812 corresponds to gap 55, hooks 820 corresponds to hooks 53, shaft 821 corresponds to shaft 51, and pressure plate 822 corresponds to pressure plate 56 in the first embodiment. The two ends of shaft 821 fit into cam grooves 331 in door 3 in the same manner as in the first embodiment. Shaft 821 moves in cam grooves 331 accompanying the opening and closing of door 3 so that the motion of card driving plate 8 is similar to that of card driving plate 5 of the first embodiment.

Arm 84 is attached to shaft 83b to be free to rotate, with one end of the arm attached to roller 85 and the other end attached to coil spring 86. Coil spring 86 is linked to hook 824 on second driving plate 82 after being wrapped around bearing 83 in second driving plate 82. In this way, a moment in the counter-clockwise direction in FIG. 12 is applied to arm 84 under the force of tension of coil spring 86, and the roller is pressed into contact with a curved portion 813 of first driving plate 81. First driving plate 81 and second driving plate 82 are held together by the pressure on curved portion 813 from roller 85 and the opposing force, and shafts 83a and 83b contact the end of elongated holes 810a and 810b on the side toward hooks 811.

In the first embodiment, hooks 52 and 53 engage memory cartridge 2 when it is inserted in the correct way as shown in FIG. 4, and is inserted further toward the fulcrum end of door 3 than the tip of terminal block 4 (the tip of protrusions 41a and 41b in FIG. 6). In the second embodiment, card driving plate 8 shifts toward the tip end of door 3 from the location of the card driving plate in the first embodiment, so that hooks 811 and 820 engage with memory cartridge 2 when memory cartridge 2 is separated from terminal block 4. Consequently, when door 3 opens, memory cartridge 2 protrudes a greater amount from door 3 in comparison to the first embodiment, thereby making the memory cartridge 2 easier to grasp. When door 3 is rotated further in the direction of opening from the position shown in FIG. 11, card driving plate 8 is restricted by connecting plate 6 as in the first embodiment, and hooks 811 withdraw from the path of insertion and removal of memory cartridge 2.

Figure 13:
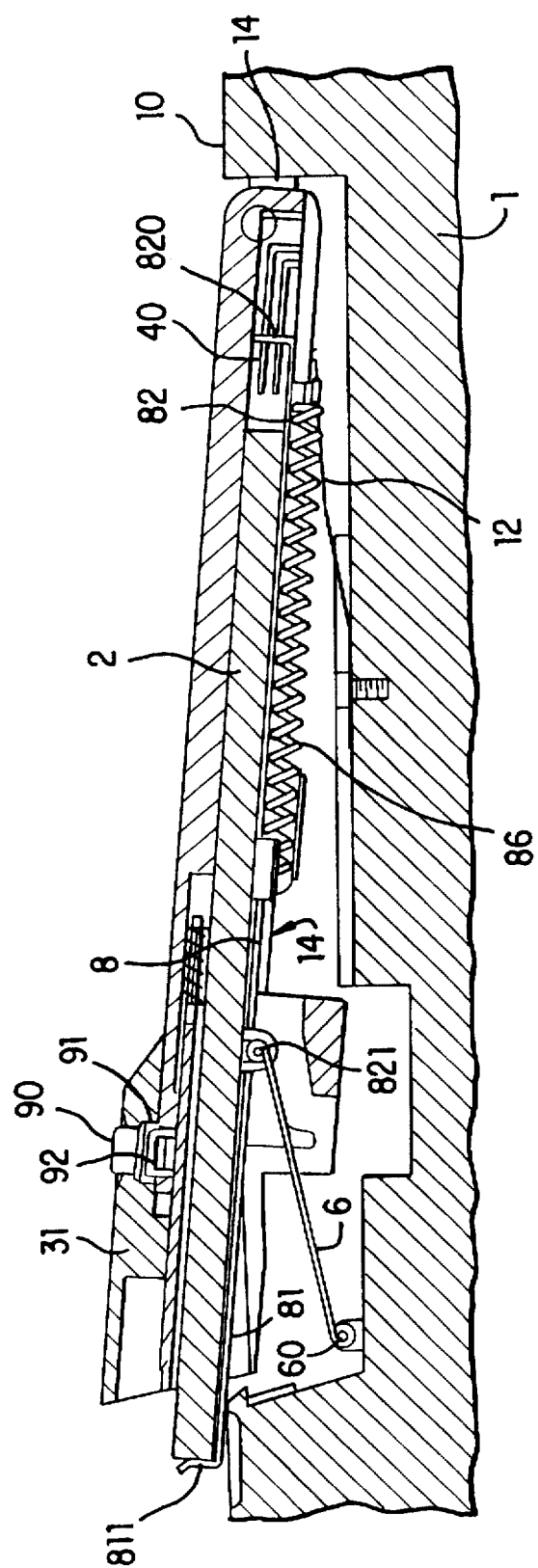
FIG. 13 shows the insertion and removal mechanism of FIG. 11 with the recording medium blocking the door from being completely closed.

When a memory cartridge 2 is inserted into door 3 and door 3 is depressed, shaft 821 of card driving plate 8 slides in cam grooves 331 and shifts toward terminals 40 and memory cartridge 2 also moves toward terminals 40 by hooks 811. At this time, the force of depressing door 3 is transferred from shaft 821 to second driving plate 82, which is forced toward the fulcrum end of door 3. On the other hand, an opposing force to the force of inserting the memory cartridge 2 is applied to hooks 811 and first driving plate 81 is forced toward the tip end of door 3. Consequently, when an obstacle to the insertion of the memory cartridge 2 is present and resistance to insertion increases (e.g., when memory cartridge 2 is inserted the wrong way either in the direction of insertion or in the direction of width), as door 3 is unreasonably depressed, the force pushing first driving plate 81 toward the tip end of door 3 becomes larger than the restricting force from coil spring 86 on first driving plate 81 and second driving plate 82. As a result, even if door 3 is depressed, only second driving plate 82 moves toward terminals 40, while first driving plate 81 does not move, thereby causing arm 84, shown in FIG. 14, to rotate in a clockwise direction. Accordingly, the force of hooks 811 on memory cartridge 2 does not increase. Eventually, memory cartridge 2 is pinched between door 3 and back surface 10 of the information device, as shown in FIG. 13.

Even when memory cartridge 2 is inserted in the correct way, when resistance to insertion increases due to the presence of foreign matter or a difference in the shape of terminals 40, first driving plate 81 is pushed strongly toward the tip end of door 3 so that unreasonable insertion of memory cartridge 2 is prevented.

Figure 14:
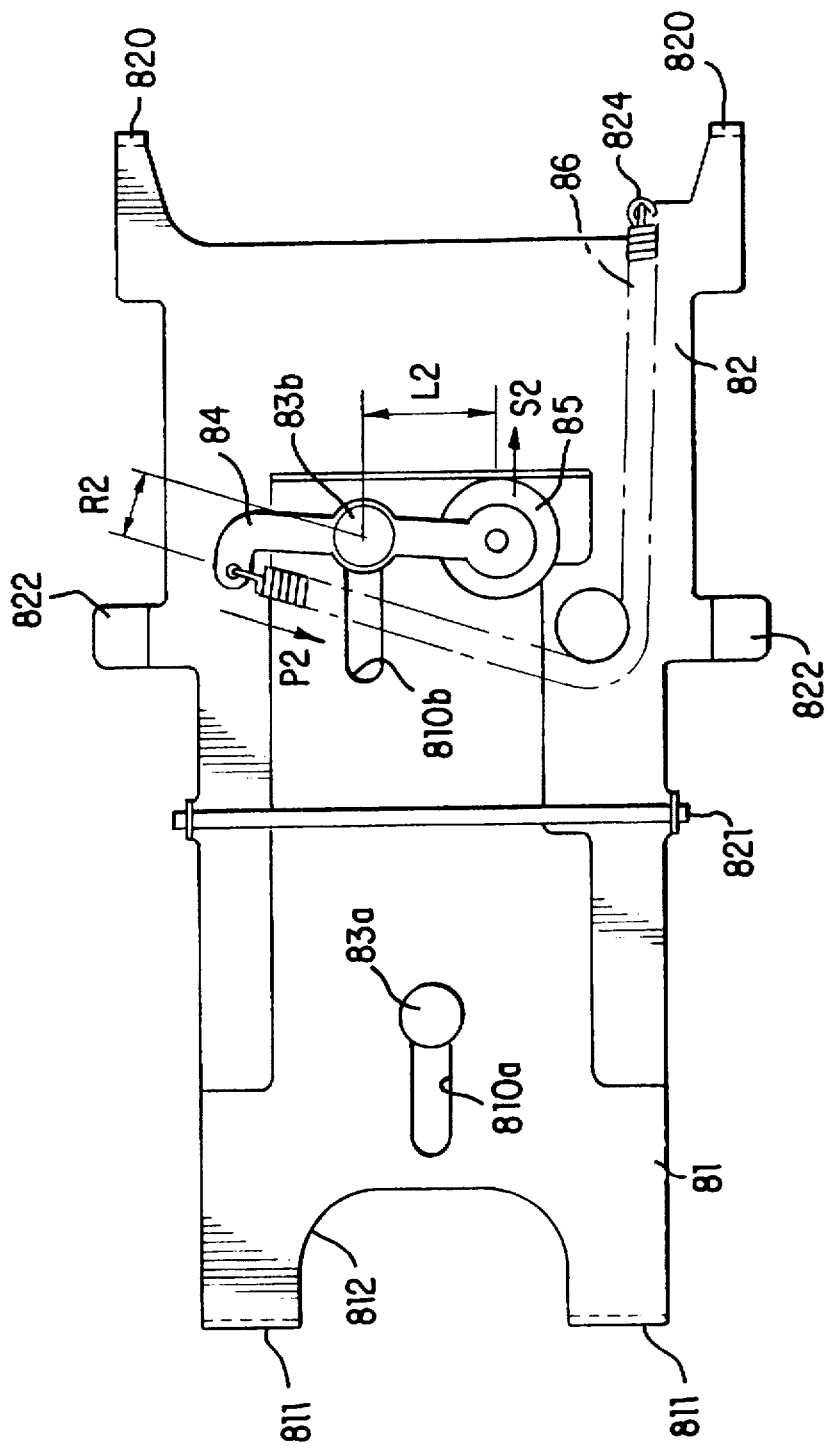
FIG. 14 is a plan view of the card driving plate of FIG. 13 as seen from the direction indicated by arrow 14 in FIG. 13.

The force needed to insert memory cartridge 2 into terminals 40 must be a maximum of F1, and the permissible load on protrusions 41a and 41b in terminal block 4 is set at F2 (>F1). In the position shown in FIG. 12, the force S1 on the curved portion 813 from roller 85 is given by: Formula 1

$$S1 = P1 * R1 / L1$$

$$S2 = P2 * R2 / L2$$

here P1 is the tension force of coil spring 86, R1 is the radius through which tension force P1 is applied, and L1 is the radius of application of the pressing force S1, with S2, P2, R2 and L2 being the corresponding values for the position shown in FIG. 14.

If the rotation of arm 84 is taken into consideration, R1>R2 and L1<L2. On the other hand, P1<P2 because the extension of coil spring 86 is larger in the position shown in FIG. 14. But, because the free length of coil spring 86 is large and the spring coefficient is small, S1≧S2 because of the relationships R1>R2 and L1<L2. In other words, the pressing force S2, when an insertion abnormality occurs such as shown in FIG. 13 and FIG. 14, is less than the pressing force S1 when memory cartridge 2 is correctly inserted. Consequently, if the pressing force S1 is set at least as great at F1 but less than F2, the pressing force on memory cartridge 2 from hooks 811 will not exceed the permissible load F2 on terminal block 4. Therefore, it is preferable for the permissible load F2 on terminal block 4 to be no less than 6 kg and the pressing force S1 to be set at around 5 kg, because the pressing force F1, when 68 terminal pins are provided needs to be around 4 kg.

Figure 15:
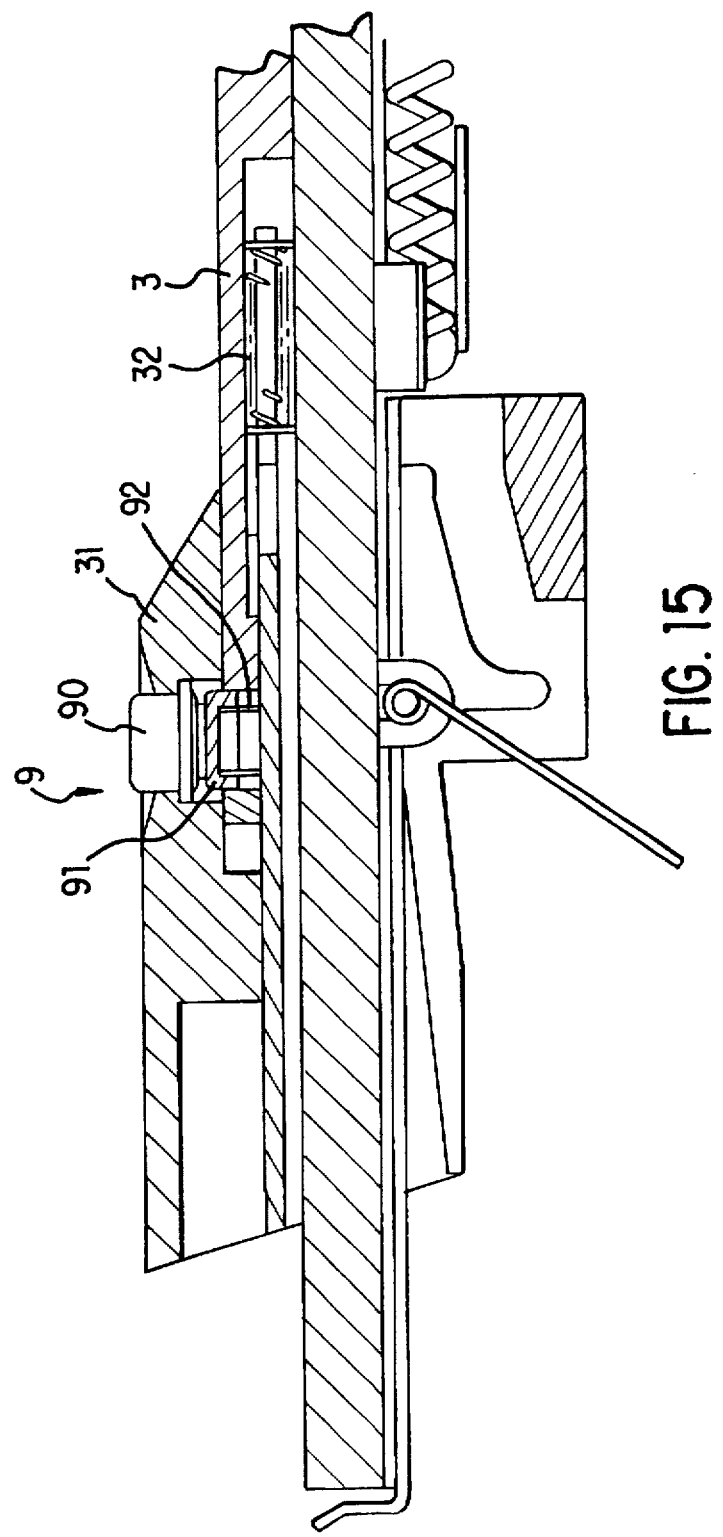
FIG. 15 is enlarged side, cross-sectional view of the lock mechanism as shown in FIG. 11.

In the example shown in FIGS. 11 to 14, a lock mechanism 9 comprising a lock release button 90, a lock frame 91 and a coil spring 92 is provided on door 3 in place of ring 37 and step pin 16 of the first embodiment. An enlargement of this lock mechanism 9 is shown in FIG. 15. Lock release button 90 is supported by a knob 31 so as to be capable of moving up and down, a direction approximately perpendicular to the surface of door 3. Lock frame 91 is supported by door 3 so as to be capable of moving up and down, and coil spring 92 forces both lock release button 90 and lock frame 91 upward. When lock release button 90 is not being operated, lock frame 91 protrudes from the surface of door 3 under the force of coil spring 92, engaging with knob 31 and preventing movement to the right in the figure. Consequently, knob 31 will not inadvertently move, causing door 3 to open. When lock release button 90 is depressed, lock frame 91 is pressed downward and the engagement with knob 31 is released, making it possible for knob 31 to slide. When the user's hand is removed from lock release button 90, knob 31 moves to the left in the drawing under the force of coil spring 32 and lock frame 91 moves upward under the force of coil spring 92, thereby again preventing knob 31 from sliding.

Card driving plate 8, connecting plate 6 and cam grooves 331 function as the conversion means; hooks 811 in card driving plate 8 comprise the first driving unit; hooks 820 comprise the second driving unit; and first driving plate 81, arm 84, roller 85 and coil spring 86 comprise the stop means and the insertion force limiting means.

The present invention is not limited to an insertion and removal mechanism for a memory cartridge in an electronic still camera, but can also be applied to insertion and removal mechanisms for a variety of recording media.

As explained above, with the present invention, the loading chamber for the recording medium is covered by a door unit from a direction perpendicular to the direction of insertion and removal of the terminals, thereby improving operation in small areas by reducing the amount of movement of the door unit. In addition, when insertion of the medium into the loading chamber becomes impossible midway through insertion, the recording medium is not placed under a large force from the door unit. Furthermore, there is great liberty in selecting the position where the door unit is attached, thereby enhancing freedom in design.

In the present invention, a recording medium in an abnormal insertion state is not unreasonably forced into the loading chamber by the first driving unit. Therefore there is no concern of damaging the recording medium and the door unit even when an insertion abnormality occurs such as the recording medium being inserted incorrectly.

The first driving unit does not become an obstacle when recording medium 2 is inserted or removed. The recording medium can be inserted or removed without the door unit being opened a large amount, thereby improving operation in small areas.

Still further, keeping the door unit in the closed position and the operations of releasing this restriction and opening the door unit can be conducted using a key unit, thereby making operation easier.

The support unit is moved from the loading chamber toward the direction of insertion and removal of the recording medium when the door unit is closed, thereby making insertion and removal of the recording medium easier. In particular, it becomes unnecessary to reserve space in the loading chamber for insertion and removal of the terminals, thereby improving the compactness of the loading chamber.

The line to the terminals in the loading chamber and external connections can be connected through a short path via the fulcrum where the door unit is attached to the information device, making external connections easier. The recording medium is prevented from being excessively pushed when the medium is in an abnormal insertion state, and damage to the recording medium or the terminals caused by excessive pressure can thus be prevented.

The recording medium is prevented from being excessively pushed when the medium is inserted in an erroneous way, and damage to the recording medium or the terminals caused by excessive pressure can be prevented.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A recording medium insertion and removal mechanism provided in an information device, said information device including a loading chamber that receives the recording medium, a terminal side of said loading chamber including first terminals that are engageable with second terminals on the recording medium, so as to conduct at least one of inputting or outputting of information to the recording medium, said mechanism comprising:

cover means for inserting and removing the recording medium while covering the loading chamber in the information device, said cover means being movable between a closed position and an open position by moving in a direction perpendicular to a direction in which the recording medium is inserted and removed, said cover means providing an opening through which the recording medium can be inserted and removed when said cover means is in said open position;

conversion means for converting an operating force acting in the direction of opening and closing of said cover means when said cover means is moved between said open and closed positions, into a force acting in the direction of insertion and removal of the recording medium;

first driving means, driven in the direction of insertion and removal of the recording medium through the force converted by said conversion means and movable between a disengaged position whereby the first driving means extends outwardly from the loading chamber and away from the cover means so that the recording medium can be inserted into and removed from the loading chamber and an engaged position whereby the first driving means engages the recording medium when said cover means is closing so as to cause the recording medium to be moved toward the terminal side of the information device and toward the first terminals to engage the second terminals of the recording medium with the first terminals; and second driving means, driven in the direction of insertion and removal of the recording medium through said force converted by said conversion means, for engaging with the recording medium when said cover means is opening so as to cause the recording medium to move toward the side opposite the terminal side in the information device to move the second terminals of the recording medium in a direction away from the first terminals and the first driving means to the disengaged position.

2. The recording medium insertion and removal mechanism according to claim 1, wherein said first driving means does not drive the recording medium toward said terminal side unless the recording medium is inserted into said cover means by at least a predetermined amount.

3. The recording medium insertion and removal mechanism according to claim 1, wherein said first driving means withdraws from a path of insertion and removal of the recording medium in conjunction with movement of said cover means toward the open position.

4. The recording medium insertion and removal mechanism according to claim 1, further comprising:

engagement stop means for engaging said cover means with the loading chamber; and key means for releasing the engagement of said cover means by said engagement stop means in the direction of opening and closing of said cover means, said engagement stop means and said key means enabling an engagement release operation to be performed from outside of the information device when said cover means is in the closed position.

5. The recording medium insertion and removal mechanism according to claim 1, further comprising support means for supporting the recording medium inside the loading chamber, said support means being capable of moving in the direction of opening and closing of said cover means, said support means being integrally constructed with said cover means.

6. The recording medium insertion and removal mechanism according to claim 5, wherein said support means is capable of attaching to the terminals in the information device.

7. The recording medium insertion and removal mechanism according to claim 1, wherein said cover means includes a surface side exposed to an exterior of the information device, and said recording medium insertion removal device further comprises external connection means, provided on said surface side of said cover means, for electrically connecting the information device and a device other than the recording medium.

8. The recording medium insertion and removal mechanism according to claim 1, further comprising stop means for stopping the insertion of the recording medium by said first driving means when an insertion force on the terminals of the recording medium exceeds a predetermined value.

9. The recording medium insertion and removal mechanism according to claim 1, further comprising an insertion force limiting means for limiting an insertion force applied to the recording medium from said first driving means to no more than a predetermined value.

10. The recording medium insertion and removal mechanism according to claim 1, further comprising stop means for stopping the insertion of the recording medium by said first driving means when the recording medium does not correctly fit with the terminals of the information device.

11. A recording medium insertion and removal mechanism provided in an information device, said information device including a loading chamber that receives the recording medium, a terminal side of said loading chamber including first terminals that are engageable with second terminals on the recording medium so as to conduct at least one of inputting or outputting of information to the recording medium, said mechanism comprising:

a door that is movable in a first direction between a closed position and an open position to selectively cover and uncover the loading chamber, said door, when in the open position, providing an opening through which the recording medium can be inserted into and removed from the loading chamber by moving the recording medium in a second direction perpendicular to said first direction;

a force conversion mechanism linked to the door, said force conversion mechanism having an output member that produces an output force in said second direction upon movement of said door in said first direction;

at least one first driving member linked to said conversion mechanism and movable in said second direction when driven by said conversion mechanism from a disengaged position whereby the first driving member extends outwardly from the loading chamber and away from the door so that the recording medium can be inserted into and removed from the loading chamber and to an engaged position to engage with the recording medium when said door is closing so as to cause the recording medium to be moved toward the terminal side and to cause the second terminals of the recording medium to move toward and engage with the first terminals; and at least one second driving member linked to said conversion mechanism and movable in said second direction when driven by said conversion mechanism to engage with the recording medium when said door is opening so as to cause the recording medium to move toward a side of the loading chamber opposite the terminal side to move the second terminals of the recording medium in a direction away from the first terminals and the at least one first driving member to the disengaged position.

12. The recording medium insertion and removal mechanism according to claim 11, wherein said door comprises an underside facing the information device and said conversion mechanism comprises:

at least one card driving plate connected to said underside of said door;

at least one cam groove positioned on said underside of said door;

a connecting plate extending from said at least one card driving plate to the loading chamber of the information device; and a shaft inserted in said at least one cam groove connecting said at least one card driving plate and said connecting plate.

13. The recording medium insertion and removal mechanism according to claim 12, wherein said at least one card driving plate comprises a first card driving plate and a second card driving plate.

14. The recording medium insertion and removal mechanism according to claim 12, wherein said at least one card driving plate comprises a first card driving plate and a second card driving plate that are movable relative to each other in said second direction, a spring biasing said first and second card driving plates toward each other in said second direction with a force selected so that said first driving member stops driving the recording medium in the second direction when the recording medium experiences a predetermined amount of resistance during insertion.

15. The recording medium insertion and removal mechanism according to claim 11, further comprising at least one support on said door, said at least one support supporting the recording medium inside the loading chamber, said support permitting movement of the recording medium in said second direction.

16. The recording medium insertion and removal mechanism according to claim 11, further comprising:

a protrusion positioned on the information device for engaging said door with the loading chamber; and a knob on an exterior side of said door, said knob being releasably engageable with said protrusion.

17. An information device for inputting or outputting information to a recording medium comprising:

a loading chamber that receives the recording medium, said loading chamber including a terminal side and a side opposite said terminal side, said terminal side including first terminals that are engageable with second terminals on the recording medium; and a recording medium insertion and removal mechanism, said mechanism comprising:

a door that is movable in a first direction between a closed position and an open position to selectively cover and uncover said loading chamber, said door, when in the open position, providing an opening through which the recording medium can be inserted into and removed from said loading chamber by moving the recording medium in a second direction perpendicular to said first direction;

a force conversion mechanism linked to the door, said force conversion mechanism having an output member that produces an output force in said second direction upon movement of said door in said first direction;

at least one first driving member linked to said conversion mechanism and movable in said second direction when driven by said conversion mechanism from a disengaged position whereby the first driving member extends outwardly from the loading chamber and away from the door so that the recording medium can be inserted into and removed from the loading chamber and to an engaged position to engage with the recording medium when said door is closing so as to cause the recording medium to be moved toward said terminal said and the second terminals of the recording medium to move toward and engage with the first terminals; and at least one second driving member linked to said conversion mechanism and movable in said second direction when driven by said conversion mechanism to engage with the recording medium when said door is opening so as to cause the recording medium to move toward said opposite side of said loading chamber to move the second terminals of the recording medium in a direction away from the first terminals and the at least one first driving member to the disengaged position.

18. The information device according to claim 17, wherein said door comprises an underside facing said information device and said conversion mechanism comprises:

at least one card driving plate connected to said underside of said door;

at least one cam groove positioned on said underside of said door;

a connecting plate extending from said at least one card driving plate to said loading chamber; and a shaft inserted in said at least one cam groove connecting said at least one card driving plate and said connecting plate.

19. The information device according to claim 18, wherein said at least one card driving plate comprises a first card driving plate and a second card driving plate.

20. The information device according to claim 18, wherein said at least one card driving plate comprises a first card driving plate and a second card driving plate that are movable relative to each other in said second direction, a spring biasing said first and second card driving plates toward each other in said second direction with a force selected so that said first driving member stops driving the recording medium in the second direction when the recording medium experiences a predetermined amount of resistance during insertion.

21. The information device according to claim 17, further comprising at least one support on said door, said at least one support supporting the recording medium inside said loading chamber, said support permitting movement of the recording medium in said second direction.

22. The information device according to claim 17, further comprising:

a protrusion positioned in said loading chamber for engaging said door with said loading chamber; and a knob on an exterior side of said door, said knob being releasably engageable with said protrusion.

23. The information device according to claim 17, wherein said information device comprises an electronic still camera.

* * * * *